United States Patent [19]

Reske et al.

[11] Patent Number: 4,517,319

[45] Date of Patent: May 14, 1985

[54] TOUGHENED POLYOXYMETHYLENE AND SHAPED ARTICLES PRODUCED THEREFROM

[75] Inventors: Eckart Reske, Hofheim am Taunus; Ernst Wolters, Königstein, both of Fed. Rep. of Germany

[73] Assignee: Hoechst Aktiengesellschaft, Frankfurt, Fed. Rep. of Germany

[21] Appl. No.: 576,115

[22] Filed: Feb. 2, 1984

[30] Foreign Application Priority Data

Feb. 4, 1983 [DE] Fed. Rep. of Germany ....... 3303760

[51] Int. Cl.$^3$ .......................... C08K 9/02; C08K 3/10; C08L 59/00; C08L 75/04
[52] U.S. Cl. ...................... 523/200; 523/213; 523/216; 524/413; 524/424; 524/425; 524/432; 524/456; 524/538; 524/546
[58] Field of Search ................ 525/456; 524/425, 424, 524/546, 413, 432, 538; 523/200, 213, 216

[56] References Cited

U.S. PATENT DOCUMENTS

| | | | |
|---|---|---|---|
| 3,256,245 | 6/1966 | Wagner | 525/429 |
| 3,766,298 | 10/1973 | McAndrew | 524/589 |
| 3,781,381 | 12/1973 | Koleske et al. | 525/186 |
| 4,179,479 | 12/1979 | Carter | 525/125 |
| 4,347,338 | 8/1982 | Torii et al. | 525/130 |
| 4,388,865 | 6/1983 | Kellner | 264/25 |

FOREIGN PATENT DOCUMENTS

| | | |
|---|---|---|
| 0038881 | 1/1981 | European Pat. Off. . |
| 1193240 | 5/1965 | Fed. Rep. of Germany . |
| 2051028 | 4/1971 | Fed. Rep. of Germany . |

OTHER PUBLICATIONS

Derwent Abst. 56044E/27, Sumitomo Bakelite Kd, (5–1982), J57085994.
Derwent Abst. 36898R, Mobay, (5–1970), CA842325.
Derwent Abst. 30099S, Celanese, (4–1971), BE-757920.

*Primary Examiner*—Herbert J. Lilling
*Attorney, Agent, or Firm*—Connolly and Hutz

[57] ABSTRACT

The invention relates to mixtures essentially composed of a polyoxymethylene, a polyurethane and a filler, the polyurethane having a Shore hardness A of not more than 90 and the filler having an average particle size less than 10 $\mu$m.

The shaped articles produced from the mixture according to the invention are distinguished, above all, by improved notched impact strength.

10 Claims, No Drawings

TOUGHENED POLYOXYMETHYLENE AND SHAPED ARTICLES PRODUCED THEREFROM

Thermoplastic polyoxymethylene molding compositions, which contain essentially oxymethylene units, have been used as versatile materials for a long time. They are distinguished, in particular, by high strength and hardness and by good resistance to chemicals and can, therefore, be employed instead of metals in many cases. However, the polyoxymethylenes have a relatively low toughness, in particular a low impact strength, which naturally restricts their capacity to be used for some purposes.

As described in German Pat. No. 1,193,240 and in German Offenlegungsschrift No. 2,051,028, the toughness of polyoxymethylene can be improved by modifying this polymer with thermoplastic polyurethanes. It is mentioned in this connection in German Offenlegungsschrift No. 2,051,028 that it is also possible to add other additives, such as carbon black and fillers, to the mixtures of polyoxymethylene and polyurethane in order, for example, to improve the strength properties. However, it is a disadvantage in this respect that mixing fillers into plastics which have been toughened results in a marked deterioration in the toughness properties.

The object of the present invention was, therefore, to provide suitable mixtures which do not have the disadvantages of the known mixtures, in particular their unsatisfactory toughness properties.

It has now been found that this object can be achieved, surprisingly, by employing polyurethanes of a specific Shore hardness together with fillers of a specific average particle size.

The invention therefore relates to a mixture composed essentially of polyoxymethylene, polyurethane and filler, wherein the polyurethane has a Shore hardness A of not more than 90, preferably 50-85, and the filler has an average particle size less than 10 $\mu$m, preferably less than 5 $\mu$m.

The invention also relates to shaped articles produced from a mixture of this type.

The polyoxymethylenes used in accordance with the invention are known and are described, for example, in German Offenlegungsschrift No. 2,947,490. They are essentially unbranched linear polymers containing, as a rule, at least 80%, preferably at least 90%, of oxymethylene units ($-CH_2O-$), and are homopolymers of formaldehyde or its cyclic oligomers, such as trioxane or tetroxane, or copolymers of these monomers.

The homopolymers in this case are formaldehyde homopolymers in which the hydroxyl end groups have been stabilized chemically, in a known manner, for example by esterification or etherification, against degradation.

The copolymers are copolymers formed from formaldehyde or its cyclic oligomers, in particular trioxane, and cyclic ethers, cyclic acetals and/or linear polyacetals.

Comonomers which are suitable for trixoane are (a) cyclic ethers containing 3, 4 or 5, preferably 3, ring members, (b) cyclic acetals other than trioxane having 5-11, preferably 5, 6, 7 or 8, ring members and (c) linear polyacetals, in each case in amounts of 0.1-20, preferably 0.5-10, % by weight. Copolymers formed from 99-95% by weight of trioxane and 1-5% by weight of one of the abovementioned co-components are the most suitable. Comonomers suitable for trioxane are, in particular, compounds of the formula

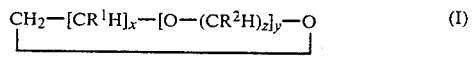

in which (A) $R^1$ and $R^2$ are identical or different and each denotes a hydrogen atom, an aliphatic alkyl radical having 1-6, preferably 1, 2, 3 or 4, carbon atoms or a phenyl radical and (a) x is 1, 2 or 3 and y is zero or (b) x is zero, y is 1, 2 or 3 and z is 2 or (c) x is zero, y is 1 and z is 3, 4, 5 or 6, or (B) $R^1$ denotes an alkoxymethyl radical having 2-6, preferably 2, 3 or 4, carbon atoms or a phenoxymethyl radical, x being 1 and y being zero.

Suitable cyclic ethers are, above all, epoxides, for example ethylene oxide, styrene oxide, propylene oxide and ephichlorohydrin, and also phenyl glycidyl ethers.

Suitable cyclic acetals are, above all, cyclic formals of aliphatic or cycloaliphatic $\alpha,\omega$-diols which contain 2-8, preferably 2, 3 or 4, carbon atoms and in which the carbon chain can be interrupted at intervals of 2 carbon atoms by an oxygen atom, for example glycol formal (1,3-dioxolane), propanediol formal (1,3-dioxane), butanediol formal (1,3-dioxepane) and diglycol formal (1,3,6-trioxocane) as well as 4-chloromethyl-1,3-dioxolane and hexanediol formal (1,3-dioxonane). Unsaturated formals, such as butenediol formal (1,3-dioxacyclohept-5-ene), are also suitable.

Linear polyacetals which can be employed are both homoplymers or copolymers of the cyclic acetals defined above and linear condensation products formed from aliphatic or cycloaliphatic $\alpha,\omega$-diols and aliphatic aldehydes, preferably formaldehyde. Homopolymers of cyclic formals of aliphatic $\alpha,\omega$-diols having 2-8, preferably 2, 3 or 4, carbon atoms are used in particular, for example poly-(1,3-dioxolane), poly-(1,3-dioxane) and poly-(1,3-dioxepane).

Compounds having several polymerizable groups in the molecule, for example alkyl glycidyl formals, polyglycol diglycidyl ethers, alkanediol diglycidyl ethers or bis-(alkanetriol) triformals, are also optionally used, in an amount of 0.05-5, preferably 0.1-2, % by weight, relative to the total quantity of monomer, as additional comonomers for trioxane.

Under alkyl glycidyl formals mention should be made of compounds of the formula

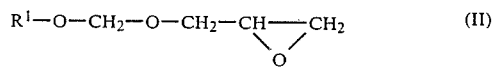

in which $R^1$ denotes an aliphatic alkyl radical having 1-10, preferably 1-5, carbon atoms. Alkyl glycidyl formals of the above formula containing linear, saturated, aliphatic alkyl radicals, for example methyl glycidyl formal, ethyl glycidyl formal, propyl glycidyl formal and butyl glycidyl formal, are particularly suitable.

Polyglycol diglycidyl ethers denote compounds of the formula (III)

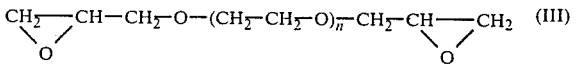

in which n denotes an integer from 2 to 5. Polyglycol diglycidyl ethers of the above formula in which n represents 2 or 3, for example diethylene glycol diglycidyl ether and triethylene glycol diglycidyl ether, are particularly suitable.

Alkanediol diglycidyl ethers are compounds of the formula (IV)

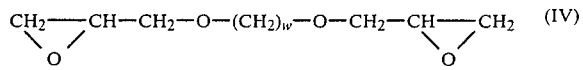

in which w denotes an integer from 2 to 6, preferably 2, 3 or 4. Butanediol diglycidyl ether is particularly suitable.

Bis-(alkanetriol) triformals are understood to mean compounds having one linear and two cyclic formal groups, in particular compounds of the formula (V)

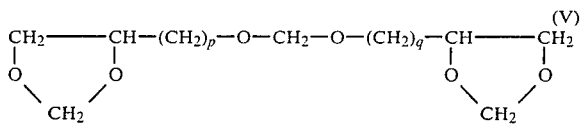

in which p and q each denote an integer from 3 to 9, preferably 3 or 4. Symmetrical bis-(alkanetriol) triformals of the abovementioned formula in which p and q denote the same number, for example bis-(1,2,5-pentanetriol) triformal and preferably bis(1,2,6-hexanetriol) triformal, are particularly suitable.

The values of the reduced specific viscosity (RSV values) of the polyoxymethylene are generally 0.3–2.0 dl.g$^{-1}$, preferably 0.5–1.5 dl.g$^{-1}$ (determined in butyrolactone, stabilized with 2% by weight of diphenylamine, at 140° C. in a concentration of 0.5 g/100 ml), and the melt flow index values MFI 190/2 are in most cases between 0.02 and 10 g.minute$^{-1}$. The crystallite melting point of the polyoxymethylene is within the range from 140° to 180° C., preferably 150° to 170° C.; its density is 1.38–1.45 g.ml$^{31}$ $^1$, preferably 1.40–1.43 g.ml$^{-1}$ (determined as specified in DIN 53,479).

The trioxane copolymers which are used in accordance with the invention, preferably binary or ternary copolymers, are prepared in a known manner by polymerizing the monomers in the presence of cationic catalysts at temperatures between 0° and 100° C., preferably 50° and 90° C. (cf., for example, U.S. Pat. No. 3,027,352). Examples of catalysts used in this process are Lewis acids, for example boron trifluoride and antimony pentafluoride, and complex compounds of Lewis acids, preferably etherates, for example boron trifluoride diethyl etherate and boron trifluoride di-tert.-butyl etherate. Proton acids, for example perchloric acid, and salt-like compounds, for example triphenylmethyl hexafluorophosphate, triethyloxonium tetrafluoborate or acetyl perchlorate, are also suitable. The polymerization can be carried out in the mass, in suspension or in solution. The copolymers can, however, also be prepared in a known manner by the application of suitable heat treatment, in the presence of catalysts described above, to mixtures of formaldehyde homopolymers and the said comonomers and/or copolymers of formaldehyde and the said comonomers.

In order to remove unstable constituents, the copolymers are advantageously subjected to a thermal or hydrolytic, controlled partial degradation extending to primary alcohol end groups (cf. U.S. Pat. Nos. 3,103,499 and 3,219,623).

The homopolymers of formaldehyde or trioxane which are used in accordance with the invention are also prepared in a known manner by catalytic polymerization of the monomer (cf., for example, U.S. Pat. Nos. 2,768,994 and 2,989,505) and are stabilized by esterification or etherification against degradation of the end of the chain.

The polyurethanes which are, in accordance with the invention, to be mixed into the polyoxymethylene, are preferably thermoplastic and are the known products such as are described, for example, in German Pat. No. 1,193,240 or German Offenlegungschrift No. 2,051,028. They are prepared in a known manner by polyaddition from polyisocyanates, in particular diisocyanates, polyesters and/or polyethers or polyester-amides or other suitable hydroxy or amino compounds, such as, for example, hydroxylated polybutadiene, and, if appropriate, chain lengtheners such as low-molecular polyols, in particular diols, polyamines, in particular diamines, or water.

Examples of suitable diisocyanates are diisocyanates of the general formula

in which R is a divalent, linear or branched aliphatic radical having 1 to 20, preferably 2 to 12, carbon atoms or a divalent, cycloaliphatic radicl having 4 to 20, preferably 6 to 15, carbon atoms or a divalent, substituted or unsubstituted aromatic radical having 6 to 25, preferably 6 to 15, carbon atoms.

An example of a suitable divalent aliphatic radical is the alkylidene radical —(CH$_2$)$_n$— in which n is preferably 2 to 12, such as the ethylidene, propylidene, pentamethylene or hexamethylene radical and the like or the 2-methylpentamethylene radical, the 2,2,4-trimethylhexamethylene radical or the 2,4,4-trimethylhexamethylene radical. Diisocyanates of this type which are particularly preferred are hexamethylene diisocyanate and also 2,2,4-trimethylhexamethylene diisocyanate and 2,4,4-trimethylhexamethylene diisocyanate.

If R in the above formula (VI) denotes a cycloaliphatic radical, this is preferably the unsubstituted or substituted cyclohexane radical. Examples of diisocyanates of this type are 1,2-di-(isocyanatomethyl)-cyclohexane or 1,4-di-(isocyanatomethyl)-cyclohexane or isophorone diisocyanate.

R in the above formula (VI) can also represent a combination of divalent, open-chain aliphatic and cycloaliphatic radicals, and can, for example, denote

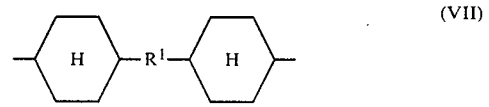

in which R$^1$ denotes a saturated, linear or branched aliphatic radical having 1 to 8, preferably 1 to 3, carbon atoms. The two rings here preferably represent unsubstituted cyclohexane, while R$^1$ preferably denotes the methylene, ethylene, methylmethylene or dimethylmethylene group.

If R in the above formula (VI) represents a divalent aromatic aromatic radical, this is preferably the toluene, diphenylmethane, phenylene or naphthalene radical. The following are examples of corresponding diisocyanates: 2,4-toluene diisocyanate, 2,6-toluene diisocyanate, diphenylmethane-4,4'-diisocyanate, 3,3'-dimethyldiphenylmethane-4,4'-diisocyanate, 3,3'-dimethyl-4,4'-diphenylene diisocyanate (3,3-bitoluene-4,4'-diisocyanate), m-phenylene diisocyanate, p-phenylene diisocyanate, o-phenylene diisocyanate, chlorophenylene-2,4-toluene diisocyanate, 3,3'-dichlorodiphenyl-4,4'-diisocyanate, 4-chloro-1,3-phenylene diisocyanate, 1,5-naphthalene diisocyanate and 1,4-naphthalene diisocyanate.

The diisocyanates of the formula (VI) can also be used in an oligomeric form, for example in a dimeric or trimeric form. Instead of the polyisocyanates, it is also possible to use polyisocyanates which have been masked in a known manner and which are obtained from the isocyanates mentioned, for example by an addition reaction with phenol or caprolactam.

Suitable aliphatic polyhydroxy compounds are polyethers, such as polyethylene glycol ethers, polypropylene glycol ethers and polybutylene glycol ethers, poly-1.4-butanediol ethers or mixed polyethers formed from ethylene oxide and propylene oxide. It is also possible to employ polyester-amides, polyacetals and, preferably, aliphatic polyesters for this purpose, all these compounds having free OH end groups.

The aliphatic polyesters are essentially noncrosslinked polyesters having molecular weights of 500–10,000, preferably 500–5,000. As far as the acid component is concerned, they are derived from unbranched and/or branched aliphaic dicarboxylic acids, such as, for example, dicarboxylic acids of the general formula $$HOOC-(CH_2)_n-COOH \tag{VIII}$$

in which n=0 to 20, preferably 4 to 10, especially adipic acid and sebacic acid. It is also possible to employ for this purpose cycloaliphatic dicarboxylic acids, such as cyclohexanedicarboxylic acids, and also mixtures with the above aliphatic dicarboxylic acids.

Suitable alcohol components for these polyesters are, above all, unbranched or branched aliphatic primary diols, such as, for example, diols of the general formula $$HO-(CH_2)_m-OH \tag{IX}$$

in which m=2 to 12, preferably 2 to 6. Compounds which may be mentioned here particularly are ethylene glycol, 1,4-butanediol, 1,6-hexanediol and 2,2-dimethyl-1,3-propanediol, and also diethylene glycol. Cycloaliphatic diols, such as bis-hydroxymethylcyclohexanes, or mixtures with the aliphatic diols are also suitable for this purpose.

The polyesters can be prepared from one particular dicarboxylic acid and one particular diol, but can also be prepared, as mentioned, from mixtures of several dicarboxylic acids and/or several diols.

Possible chain lengtheners for the preparation of the polyurethanes are, above all, low-molecular polyols, in particular diols, and also polyamines, especially diamines, or water.

The polyurethanes which are employed in accordance with the invention are preferably thermoplastic and thus preferably essentially non-crosslinked, i.e. they can be melted repeatedly without appreciable manifestations of decomposition. Their reduced specific viscosities, determined at 30° C. in dimethylformamide, are as a rule 0.5–3 dl/g, preferably 1–2 dl/g. The values of elongation at break are preferably 800–1,500%, preferably 1,000–1,500%, while the Shore hardness A is not higher than 90 and is preferably between 50 and 85, particularly between 65 and 80, and the glass transition temperature is preferably not higher than 0° C., particularly preferentially not higher than −10° C.

Fillers suitable for the mixtures according to the invention are the inorganic or organic substances which are known for this purpose in the case of polyoxymethylene and polyurethane. Preferably, they should neither melt or sinter together nor decompose to an appreciable extent below 230° C., preferably below 250° C., and should not have a decomposing action on the polyoxymethylene either at room temperature or at the customary processing temperatures of up to 250° C., particularly up to 220° C. Strongly acid fillers are accordingly not suitable for the present purposes.

The filters employed in accordance with the invention possess average particle sizes (weight average) of less than 10 μm, preferably less than 5 μm and especially from 0.001 to 3 μm. Fillers having a particle size less than 5 μm and containing a proportion by weight not more than 3%, preferably not more than 2%, of particles having a particle size greater than 10 μm are particularly preferred.

Examples of suitable fillers are inorganic substances and minerals, such as, for example, oxides, hydroxides, carbonates, silicates, sulfates, phosphates and sulfides.

Examples which should be mentioned amongst the oxides are calcium oxide, cobalt oxide, iron oxides, chromium oxide and preferably magnesium oxide (magnesia), zinc oxide, aluminum oxide and titanium dioxide. Oxides which are preferably employed in accordance with the invention also include silicon dioxide, particularly in the form rendered hydrophobic, which is obtained, for example, by surface treatment with silanes (for example dichlorodimethylsilane) (for example ®Aerosil R 972).

Examples of suitable hydroxides are calcium hydroxide and preferably aluminum hydroxide, while examples of suitable carbonates are strontium carbonate and barium carbonate and preferably magnesium carbonate, calcium carbonate and zinc carbonate and mixed carbonates, such as, for example, dolomite.

Examples of suitable silicates which may be enumerated are asbestos minerals, mica, felspars, wollastonite, talc, zeolites, ultramarines and finely divided glasses.

Suitable sulfates include, for example, lead sulfate and strontium sulfate and preferably calcium sulfate and barium sulfate. Examples of suitable phosphates which may be mentioned are tricalcium phosphate, fluorapatite and phosphorite, while examples of suitable sulfides are Zn sulfide and cadmium sulfide and heavy metal sulfides.

Carbon black and graphite are also very suitable as filters within the scope of the invention.

Finally, it is also possible to employ, in accordance with the invention, inorganic colored pigments and also organic colored pigments of adequate heat stability, such as are used for coloring polyacetals. Furthermore, organic, high-melting or crosslinked compositions, such as, for example, melamine-formaldehyde resins of a suitable composition, can also be used as fillers according to the invention.

The composition of the mixture according to the invention depends on the nature of the materials used, and can be calculated from the following equations:

$$P_1 = 100 - (P_2 \ 30 \ P_3)$$

$$P_2 = \frac{100 \, p_2 \, (1-a) \, b}{p_1 \, (1-b) + p_2 \, (1-a) \, b + p_3 \, a \, b}$$

-continued $$P_3 = \frac{P_2 \rho_3 a}{\rho_2 (1 - a)}$$

in which the symbols used have the following meaning:
$P_1 = \%$ by weight of polyoxymethylene
$P_2 = \%$ by weight of polyurethane
$P_3 = \%$ by weight of filler
$\rho_1 =$ density of the polyoxymethylene in g.cm$^{-3}$
$\rho_2 =$ density of the polyurethane in g.cm$^{-3}$
$\rho_3 =$ density of the filler in g.cm$^{-3}$
$a = $ a number which can assume values between 0 and 0.4, preferably between 0 and 0.3, but for which the value selected must at least be sufficiently high to give a value for $P_3$ of at least 0.5%, preferably at least 1%, and
$b = $ also a number which can assume values of 0.03–0.55, preferably 0.05–0.5.

Mixtures in which a is less than or equal to 0.25 and b is 0.05–0.5 are particularly preferred.

As a rule the mixture according to the invention will contain 30 to 97% by weight, preferably 40 to 95% by weight, of polyoxymethylene, 2.5 to 60% by weight, preferably 5 to 45% by weight, of polyurethane and 0.5 to 50% by weight, preferably 1 to 30% by weight, of filler, in each case relative to the total mixture.

The mixture according to the invention preferably contains in each case a polyoxymethylene, a polyurethane and a filler. It can, however, also contain in each case several polyoxymethylenes and/or several polyurethanes and/or several fillers. $P_1$, $P_2$ and $P_3$ then indicate in each case the sum of the contents of polyoxymethylene and polyurethane and filler, respectively, while $\rho_1, \rho_2$ and $\rho_3$ can be calculated in each case from the densities of the individual components and the proportions of the latter by means of the mixing rule.

The mixture according to the invention can, if appropriate, also contain the known additives, such as stabilizers, nucleating agents, antistatic agents, light stabilizers, flameproofing agents, slip agents, lubricants, plasticizers, dyestuffs, optical brighteners, mold release auxiliaries, adhesion promoters and the like.

Suitable stabilizers against the effect of heat are, in particular, polyamides, amides of polybasic carboxylic acids, amidines, for example dicyandiamide, hydrazines, ureas, poly-(n-vinyl-lactams) and alkaline earth metal salts of aliphatic, monobasic to tribasic carboxylic acids having 2-20 carbon atoms and preferably containing hydroxyl groups, for example calcium stearate, calcium ricinoleate, calcium lactate and calcium citrate. The stabilizers used against oxidation are, above all, bisphenol compounds, preferably diesters of monobasic 4-hydroxyphenylalkanoic acids containing 7-13, preferably 7, 8 or 9 carbon atoms, with diols containing 2-6 carbon atoms. Examples of suitable light stabilizers are α-hydroxybenzophenone derivatives and benzotriazole derivatives. The stabilizers are employed in most cases in a total amount of 0.1-5, preferably 0.5-3, % by weight (relative to the total molding composition). Examples of adhesion promoters which should be mentioned here are alkali or alkaline earth metal salts of sulfonic acids or alkylsulfuric acids as specified in German Offenlegungsschrift No. 3,151,814.

The preparation of the mixture according to the invention is effected in a simple manner by mixing the constituents at an elevated temperature at which the polymer components melt, but do not yet decompose, i.e. in general 160° C. to 250° C., preferably 180° to 240° C., in units having a good mixing action, such as, for example, Brabender mixers or extruders, preferably twin-screw extruders, or on mixing rolls. The components can, of course, also be mixed mechanically at room temperature initially and then subsequently melted in order to achieve complete homogenization. It has been found in this respect that a mixture in which the constituents are distributed as homogeneously as would be desirable is not obtained merely by mechanical mixing without melting.

The mixture according to the invention can be comminuted mechanically, for example by chopping or grinding, to give granules, chips, flakes or powders. It is thermoplastic and therefore accessible to any modes of processing typical for thermoplastic compositions. It can, therefore, be processed by injection molding, extrusion, melt spinning or deep drawing to give shaped articles of any desired kind, and is suitable as an industrial material for the production of semi-finished and finished parts, such as shaped articles, for example tapes, rods, sheets, films, pipes and tubes, and also machine parts, for example casings, gearwheels, bearing components and control elements, and also automobile accessories, such as spoilers and the like. The paintability is also quite good if the polyurethane content is fairly high.

The following examples describe the present invention.

EXAMPLES

Preparation of the polyoxymethylene-polyurethane mixtures

Mixtures of polyoxymethylene and polyurethane, both optionally in the form of powder or granules having a particle size of approx. 3 mm, and filler were melted and homogenized at temperatures between 190° and 230° C. in a type ZDSK Werner & Pfleiderer twin-screw extruder. The ribbon of melt emerging was cooled, granulated and dried. The products were converted in a customary manner by injection molding into shaped articles, on which the following values were determined.

TESTS

The notched impact strengths were determined as specified in DIN 53,453 on a small standard test bar.

The 50% fracture energy was determined as specified in DIN 53,443 on sheets 2 mm thick.

The elongation at break (1/3 DIN) was determined as specified in DIN 53,455 on a tension bar produced from test specimen No. 3 by reduction on a scale of 1:3. The speed of drawing was 5 cm/minute.

MATERIALS

The following materials were employed in the examples:
Polyoxymethylene: A copolymer formed from trioxane and approx. 2% by weight of ethylene oxide, melt flow index MFI 190/2 approx. 0.9 g.minute$^{-1}$, density 1.41 g.cm$^{-3}$. Stabilizer: 0.1% by weight of dicyandiamide and 0.4% by weight of a phenolic antioxidant.
Polyurethane A: An aromatic polyester-polyurethane, elongation at break 500%, Shore hardness A $\geq 90$, Shore hardness D50, density 1.21 g.cm$^{-3}$.

Polyurethane B: An aromatic polyester-polyurethane, elongation at break 400–450%, Shore hardness A 85, density 1.20 g.cm$^{-3}$.

Polyurethane C: An aromatic polyester-polyurethane, elongation at break 600%, Shore hardness A 80, density 1.18 g.cm$^{-3}$.

Polyurethane D: An aliphatic polyester-polyurethane containing hexamethylene diisocyanate, adipic acid, ethylene glycol, 1,4-butanediol, neopentylglycol and 1,6-hexanediol as main constituents, elongation at break 1070%, Shore hardness A 72, density 1.14 g.cm$^{-3}$, RSV value = 1.5 dl/g, glass transition temperature −47° C.

Carbon black: Average particle size 0.035 μm, density 1.86 g.cm$^{-3}$.

Silicon dioxide: Prepared from silicon tetrachloride in an oxyhydrogen flame and rendered hydrophobic by treatment with dimethyldichlorosilane, average particle size 0.016 μm.

Titanium dioxide: Average particle size 0.28 μm, density 4.0 g.cm$^{-3}$.

Chalk: Average particle size 0.08–25 μm, density 2.7 g.cm$^{-3}$.

Talc: Average particle size 11 μm, 21% larger than 20 μm, density 2.78 g.cm$^{-3}$.

All the percentages below are to be understood as meaning % by weight. The numbers a and b have the meaning described above.

EXAMPLES 1–13

| Example | Composition | Notched impact strength (kJ · m$^{-2}$) | Elongation at break ⅓ DIN (%) |
|---|---|---|---|
| 1* | 100% of polyoxymethylene (no additives) | 6 | 45 |
| 2* | 97% of polyoxymethylene + 3% of carbon black, no polyurethane | 2.6 | 14 |
| 3* | 90% of polyoxymethylene + 10% of chalk (particle size 1 μm), no polyurethane | 3.4 | 7 |
| 4* | 80% of polyoxymethylene + 20% of polyurethane A, no filler | 6.2 | 90 |
| 5* | 77% of polyoxymethylene + 20% of polyurethane A + 3% of carbon black (a = 0.089, b = 0.249) (excessively hard polyurethane) | 3.6 | 56 |
| 6* | 80% of polyoxymethylene + 20% of polyurethane B, no filler | 7.5 | 81 |
| 7 | 77% of polyoxymethylene + 20% of polyurethane B + 3% of carbon black (a = 0.088, b = 0.251) | 8.6 | 190 |
| 8* | 80% of polyoxymethylene + 20% of polyurethane C, no filler | 8.0 | 89 |
| 9 | 77% of polyoxymethylene + 20% of polyurethane C + 3% of carbon black (a = 0.087, b = 0.254) | 9.3 | 185 |
| 10* | 80% of polyoxymethylene + 20% of polyurethane D, no filler | 17.0 | 68 |
| 11 | 77% of polyoxymethylene + 20% of polyurethane D + 3% of carbon black (a = 0.084, b = 0.260) | 19.4 | 105 |
| 12 | 70% of polyoxymethylene + 20% of polyurethane D + 10% of chalk (particle size 1 μm, a = 0.174, b = 0.300) | 24.7 | 80 |
| 13* | 77% of polyoxymethylene + 20% of polyurethane D + 3% of talc (a = 0.058, b = 0.254), (filler excessively coarse-grained) | 11.9 | 59 |

*Comparison tests

EXAMPLE 14

Mixtures were prepared containing in each case 70% of polyoxymethylene, 20% of polyurethane D and 10% of chalk, using chalk having a varying average particle size (a = 0.174, b = 0.300)

| | Average particle size, μm | Notched impact strength (kJ · m$^{-2}$) | 50%-fracture energy (J) |
|---|---|---|---|
| (a) | 0.08 | 23.8 | 35 |
| (b) | 0.2 | 19.8 | 28 |
| (c) | 0.35 | 21.0 | 33 |
| (d) | 1 | 24.7 | 36 |
| (e) | 1.5 | 18.6 | 30 |
| (f)* | 25 (Filler excessively coarse-grained) | 12.1 | 7 |
| (g)* | 80% of polyoxymethylene + 20% of polyurethane D, no filler | 17.0 | 24 |

EXAMPLE 15

Mixtures composed of (80−x)% of polyoxymethylene, 20% of polyurethane D and x% of chalk were prepared. The average particle size of the chalk was 1 μm.

| | % of chalk | a | b | Notched impact strength (kJ · m$^{-2}$) | 50%-fracture energy (J) |
|---|---|---|---|---|---|
| (a)* | 0, no filler | | | 17.0 | 24 |
| (b) | 2 | 0.041 | 0.248 | 17.9 | 26 |
| (c) | 5 | 0.095 | 0.267 | 20.1 | 29 |
| (d) | 10 | 0.174 | 0.300 | 24.7 | 36 |
| (e) | 15 | 0.241 | 0.334 | 19.6 | 30 |
| (f)* | 40, too much filler | 0.458 | 0.533 | 5.6 | 8 |

*Comparison tests

EXAMPLE 16

Mixtures composed of (80−x)% of polyoxymethylene, 20% of polyurethane D and x% of carbon black were prepared.

| | % of carbon black | a | b | Notched impact strength (kJ · m$^{-2}$) | 50%-fracture energy (J) |
|---|---|---|---|---|---|
| (a)* | 0, no filler | | | 17.0 | 24 |
| (b) | 2 | 0.058 | 0.252 | 19.2 | 27 |
| (c) | 3 | 0.084 | 0.260 | 19.4 | 27 |
| (d) | 5 | 0.133 | 0.276 | 20.5 | 29 |

EXAMPLE 17

Mixtures composed of (80-x)% of polyoxymethylene, 20% of polyurethane D and x% of titanium dioxide were prepared.

| % of titanium dioxide | a | b | Notched impact strength (kJ · m$^{-2}$) | 50%-fracture energy (J) |
|---|---|---|---|---|
| (a)* | 0, no filler | | 17.0 | 24 |
| (b) | 1 | 0.014 0.241 | 17.0 | 28 |
| (c) | 3 | 0.041 0.251 | 17.9 | 30 |
| (d) | 5 | 0.067 0.261 | 17.8 | 30 |

*Comparison tests

EXAMPLE 18

Mixtures composed of (100-x-y)% of polyoxymethylene, y% of polyurethane D and x% of silicon dioxide were prepared.

| | X | y | a | b | Notched impact strength (kJ · m$^{-2}$) | 50%-fracture energy (J) |
|---|---|---|---|---|---|---|
| (a)* | 0 | 5 | no filler | | 6.0 | 4.5 |
| (b) | 1 | 5 | 0.094 | 0.068 | 9.3 | 6 |
| (c) | 3 | 5 | 0.237 | 0.081 | 9.1 | 8 |
| (d)* | 0 | 15 | no filler | | 12.0 | 20 |
| (e) | 1 | 15 | 0.033 | 0.186 | 13.9 | 22 |
| (f) | 5 | 15 | 0.147 | 0.214 | 15.2 | 30 |
| (g) | 10 | 15 | 0.257 | 0.250 | 16.5 | 32 |
| (h)* | 0 | 20 | no filler | | 17.0 | 24 |
| (i) | 5 | 20 | 0.115 | 0.271 | 22.3 | 33 |
| (j) | 10 | 20 | 0.206 | 0.308 | 26.8 | >36 |
| (k)* | 0 | 25 | ·no filler | | 20.0 | 29 |
| (l) | 1 | 25 | 0.020 | 0.299 | 22.7 | 33 |
| (m) | 5 | 25 | 0.094 | 0.328 | 25.4 | >36 |
| (n) | 10 | 25 | 0.127 | 0.365 | 29.0 | >36 |

*Comparison tests

What is claimed is:

1. A mixture consisting essentially of a polyoxymethylene, a polyurethane and a filler, wherein the polyurethane has a Shore hardness A of not more than 90 and the filler has an average particle size less than 10 μm, and wherein the composition of the mixture is given by the equations $$P_1 = 100 - (P_2 30\ P_3)$$

$$P_2 = \frac{100\, p_2\, (1-a)\, b}{p_1\, (1-b) + p_2\, (1-a)\, b + p_3\, a\, b}$$

$$P_3 = \frac{P_2\, p_3\, a}{p_2\, (1-a)}$$

in which the symbols have the following meaning:
P$_1$=% by weight of polyoxymethylene
P$_2$=% by weight of polyurethane
P$_3$=% by weight of filler ρ$_1$=density of the polyoxymetnylene in g.cm$^{-3}$ ρ$_2$=density of the polyurethane in g.cm$^{-3}$
ρ$_3$=density of the filler material in g.cm$^{-3}$
a=a numerical value between 0 and 0.4,
b=a numerical value between 0.03 and 0.55, and
P$_3$ is at least 0.5.

2. A mixture as claimed in claim 1, wherein a has a numerical value between 0 and 0.3, b has a numerical value between 0.03 and 0.55, and P$_3$ is at least 1.

3. A mixture as claimed in claim 1, wherein a is not more than 0.25.

4. A mixture as claimed in claim 1, wherein the filler has an average particle size less than 5 μm, and contains not more than 3% by weight of particles having a particle size greater than 10 μm.

5. A mixture as claimed in claim 1, wherein the filler neither melts nor sinters together nor decomposes below 250° C.

6. A mixture as claimed in claim 5, wherein the filler neither melts nor sinters together nor decomposes below 230° C.

7. A mixture as claimed in claim 1, wherein the filler is carbon black or an oxide, sulfate, carbonate or silicate.

8. A mixture as claimed in claim 7, wherein the filler is titanium dioxide, zinc oxide, aluminum oxide, silicon dioxide which has been surface-treated with dimethyldichlorosilane, magnesium carbonate, calcium carbonate or zinc carbonate.

9. A mixture as claimed in claim 1, wherein the polyurethane is thermoplastic and has a Shore hardness A of 50 to 85.

10. A shaped article produced from the mixture as claimed in claim 1.

* * * * *